(12) United States Patent
Maple et al.

(10) Patent No.: US 6,234,595 B1
(45) Date of Patent: May 22, 2001

(54) MEDIA STORAGE SYSTEM AND METHOD

(75) Inventors: Wade Andrew Farris Maple, Carthage; Jeffrey Charles Jensen, Joplin, both of MO (US)

(73) Assignee: O'Sullivan Industries INC, Lamar, MO (US)

( * ) Notice: Subject to any disclaimer, the term of this patent is extended or adjusted under 35 U.S.C. 154(b) by 0 days.

(21) Appl. No.: 09/353,471

(22) Filed: Jul. 13, 1999

(51) Int. Cl.$^7$ .................................................. A47B 88/00
(52) U.S. Cl. .................. 312/323; 312/327; 312/313; 312/9.44
(58) Field of Search ..................... 312/246, 248, 312/321.5, 322, 323, 327, 328, 7.2, 204, 9.41, 9.42, 9.43, 9.44, 9.61, 307, 127, 123, 196, 350, 313

(56) References Cited

U.S. PATENT DOCUMENTS

| | | | |
|---|---|---|---|
| 339,325 | * 4/1886 | Rountree | 312/298 X |
| 370,557 | * 9/1887 | Petersen | 312/323 X |
| 1,929,095 | * 10/1933 | Hutchings | 312/227 X |
| 3,078,133 | * 2/1963 | Schauer | 312/298 X |
| 4,441,771 | * 4/1984 | Roesler | 312/323 X |

FOREIGN PATENT DOCUMENTS

| | | | |
|---|---|---|---|
| 2502919 | * 10/1982 | (FR) | 312/321.5 |
| 125816 | * 5/1919 | (GB) | 312/298 |

* cited by examiner

Primary Examiner—Janet M. Wilkens
(74) Attorney, Agent, or Firm—Haynes and Boone LLP

(57) ABSTRACT

A media storage system and method for use in a cabinet in which a rail member is mounted to at least one of the walls of the cabinet. A side panel is pivotally connected to the rail member for pivotal movement relative thereto, and one or more additional panels are connected to the side panel one to form a storage area. The side panel can be pivoted relative to the rail member between a first position in which the storage area is closed and a second position in which the storage area is open.

43 Claims, 4 Drawing Sheets

MEDIA STORAGE SYSTEM AND METHOD

BACKGROUND

The present disclosure relates, in general, to a media storage system and method and, more particularly, to such a system and method for storing objects, such as entertainment and/or computer media.

The dramatic increase in the amount of entertainment and computer media now available, such as CD ROMs, compact discs, video tapes, video discs, and computer discs such as ZIP™ discs, floppy discs, JAZ™ discs, etc. causes a corresponding increase in storage requirements for the media. Although relative large storage systems, such as hutches, cabinets, armoires, and the like are available for both an office and a home environment, they are less than completely satisfactory for storing this type of media. For example, most people prefer not to store their media on an exposed shelf of the cabinet but rather in a drawer, or the like, so that they are out of sight when not in use. Also, the capacity and dimensions of cabinet drawers are often not compatible with storing a relatively large quantity of media of the above type. Further, even if the media is stored on a shelf, and the shelf has a depth that would accommodate two or more rows of the media, it is difficult to access the media on one of the back rows.

Therefore, what is needed is a storage system and a method for storing entertainment and/or computer media in a cabinet, or the like, according to which the media is normally not exposed and yet is easily accessible.

SUMMARY

To this end, according to an embodiment of the invention, a rail member is mounted to at least one of two side walls of a cabinet and a side panel is pivotally connected to the rail member for pivotal movement relative thereto. One or more additional panels are connected to the side panel to form a storage area. The side panel can be pivoted relative to the rail member between a first position in which the storage area is closed and a second position in which the storage area is open.

Significant advantages are achieved with the above embodiment since the stored objects are normally not exposed and yet are easily accessible. Also, the objects can be stored in two rows with the back row being easily accessible.

DETAILED DESCRIPTION OF THE PREFERRED EMBODIMENT

Figure 1:
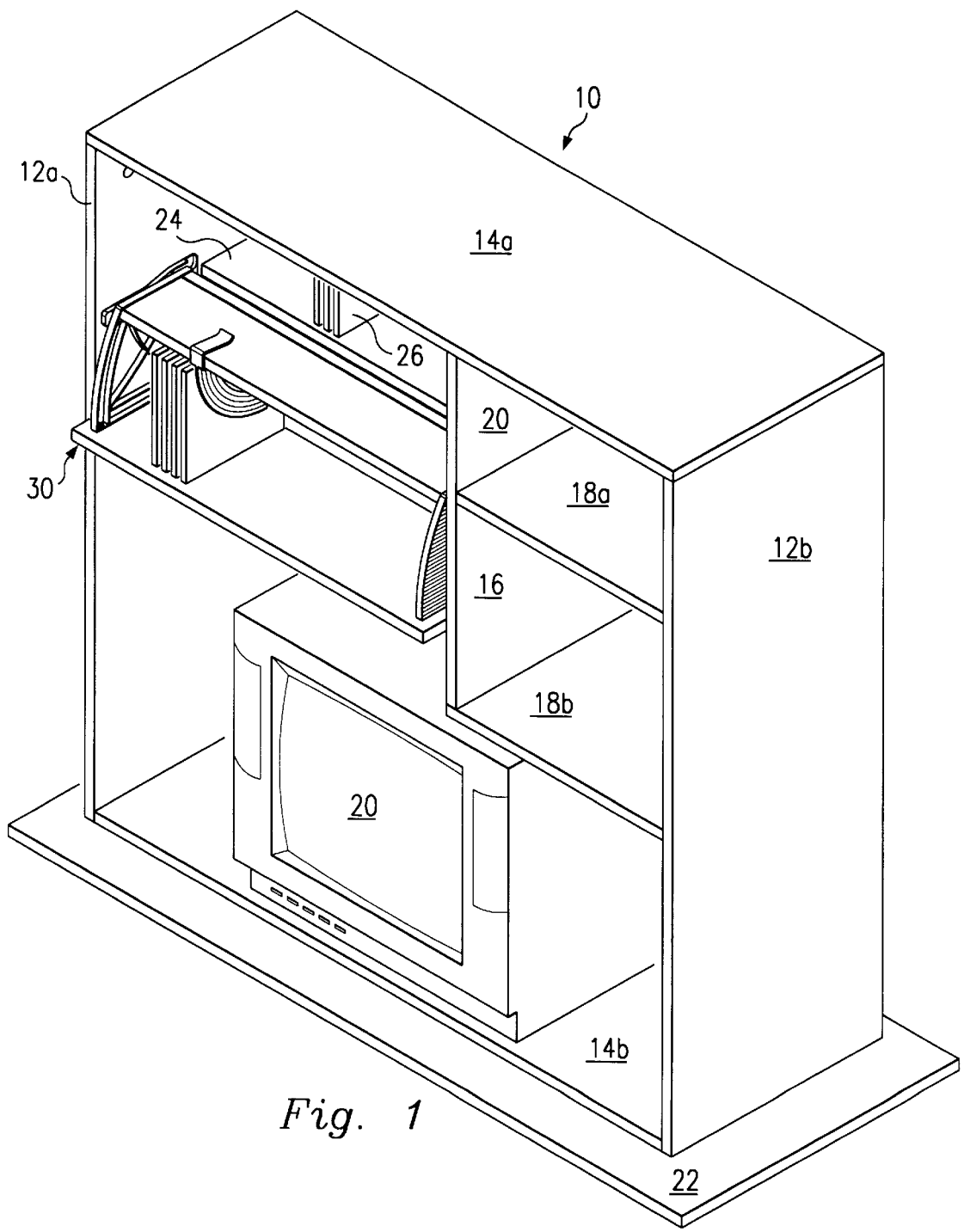
FIG. 1 is an isometric view of a cabinet, or hutch, incorporating an embodiment of the media storage system of the present invention which is shown in an open position.

Referring to FIG. 1 of the drawing, the reference numeral 10 refers to a cabinet, or hutch, having a pair of spaced, parallel, vertically-extending, side walls 12a and 12b, and two horizontally extending panels 14a and 14b extending perpendicular to the side walls, and forming the top panel and the bottom panel, respectively. A vertically-extending panel 16 extends from the top panel 14 and two spaced, horizontally-extending shelves 18a and 18b extend between the panel 16 and the side wall 12b. It is understood that the panels 14a and 14b are connected to the side walls 12a and 12b, that the panel 16 is connected to the panel 14a, and that the shelves 18a and 18b are connected to the panel 16 and to the side wall 12b in any conventional manner.

A video monitor 20 rests on the panel 14b and the panels 14a and 16, the shelves 18a and 18b, and the side wall 12a form two compartments for receiving computer or home entertainment components commonly found in an office or home environment. The entire cabinet, or hutch 10 rests on a desktop 22.

A horizontally-extending shelf 24 extends between the upper portion of the side wall 12a and the panel 16. The depth of the shelf 24 is approximately one-half the depth of the cabinet 10 and extends to the rear of the cabinet, for reasons to be described. The shelf 24 is adapted to store a plurality of discs 26 such as CD ROMs, compact discs, video discs, and computer discs such as ZIP™ discs, floppy discs, JAZ™ discs, etc. It is also understood that one or more doors (not shown) can be provided that close to cover the interior, or portions of the interior, of the cabinet in a conventional manner.

The storage system according to an embodiment of the present invention is shown, in general, by the reference numeral 30. The system 30 extends below the top panel 14a and between the upper portion of the side wall 12a, and the panel 16, and is located in front of the shelf 24. The system 30 is also adapted to store objects, such as the discs 26, and, in the open position shown, permits easy access to the latter discs and to the discs on the shelf 24. The system 30 is shown in a closed position in FIG. 2 in which it covers the shelf 24 and the discs 26.

Figures 2, 3:
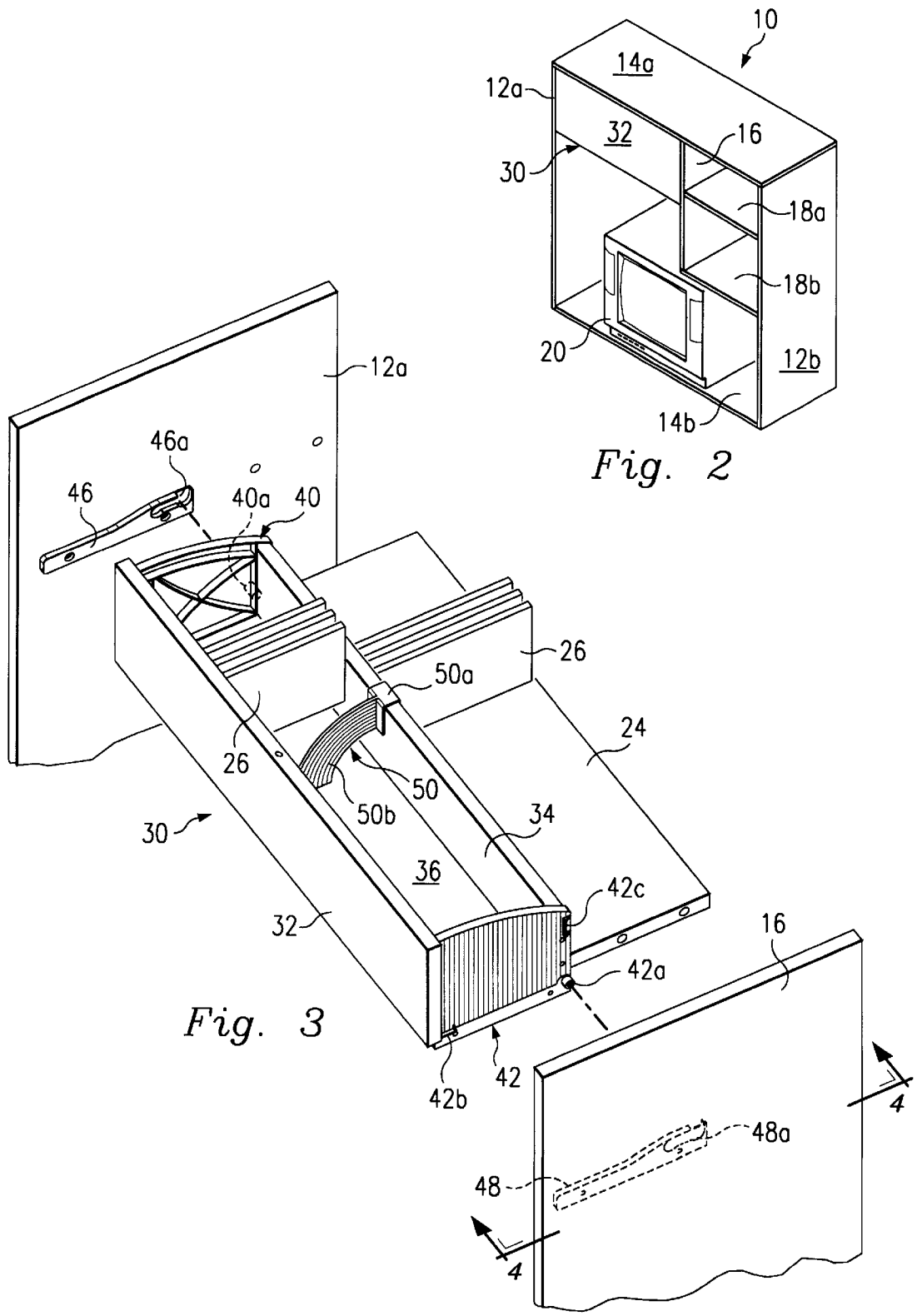
FIG. 2 is a reduced-scale view, similar to FIG. 1 but depicting the storage system in a closed position.
FIG. 3 is an enlarged, exploded view of the storage system of FIG. 1 in its closed position.

FIG. 3 depicts the system 30 in its closed position in greater detail. The system 30 comprises a front panel 32 and a rear panel 34 extending in a spaced, parallel relationship. A horizontally extending panel 36 extends perpendicular to the panels 32 and 34 and is connected thereto in a conventional manner. In the closed position of the system 30 as shown, the panel 36 forms an extension of the shelf 24.

A pair of side panels 40 and 42 are connected to the respective end portions of the front panel 32 by fasteners (not shown), and the corresponding end portions of the panels 34 and 36 extend in corresponding grooves formed in the side panels 40 and 42 and are affixed to the latter panels in any known manner. The panels 32, 34, 36, 40 and 42 thus form a storage compartment for additional objects, such as additional discs 26.

Two rails 46 and 48 are mounted to the inner surfaces of the side wall 12a and the panel 16, respectively in any conventional manner. The height of each rail 46 and 48 increases from front to back, as viewed in FIG. 3, so that its upper surface forms a ramp. A pair of slots 46a and 48a are formed in the rails 46 and 48, respectively, at the back ends of their corresponding ramps.

The side panels 40 and 42 have bosses 40a and 42a, respectively, extending from their outer surfaces which extend in the slots 46a and 48a, respectively. This permits translational and rotational movement of the side panels 40 and 42, respectively, and therefore the system 30, relative to the cabinet 10, under conditions to be described.

A pair of tabs 42b and 42c are also provided on the outer surface of the side panel 42 for reasons to be described, and, although not shown in FIG. 3, it is understood that identical tabs are provided on the side panel 40.

A divider 50 is provided that has a hook portion 50a extending over the upper edge portion of the panel 34, and an extension 50b that extends into the storage compartment defined by the panels 32, 34, 36, 40 and 42. The extension engages the discs 26 to maintain them in the vertical position shown, and/or to divide the discs into different groups.

Preferably, the side panels 40 and 42, the slides 46 and 48 and the divider are fabricated from a hard plastic material and the remaining components of the cabinet 10 and the system 30 are made of wood.

Figure 4:
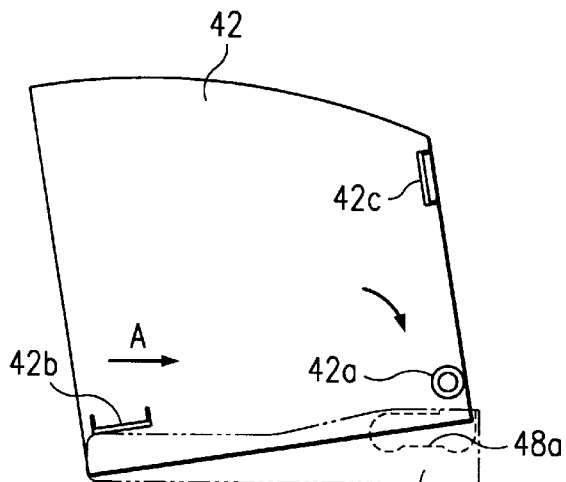
FIGS. 4–6 are schematic views taken along the line 4—4 of FIG. 3 and depicting the movement of the storage system of FIGS. 1–3 from a closed position to a open position.
Figure 5:
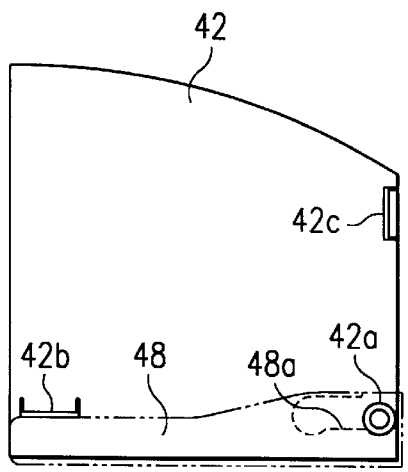

To install the system 30 in the cabinet 10, the system is inserted between the side wall 12a and the panel 16 so that the bosses 40a and 42a engage the ramps defined by the upper surfaces of the rails 46 and 48, respectively. As better shown in FIG. 4 in connection with the side panel 42 and the rail 48, the system 30 is then pushed into the cabinet 10 in the direction of the arrow A until the bosses 40a and 42a enter the slots 46a and 48a, respectively. The system 30 is then pulled towards the front of the cabinet 10 until the bosses 40a and 42a reach the front ends of the slots 46a and 48a, respectively, and the front panel 32 is lifted upwardly. When the front panel 32 is approximately parallel with the front of the cabinet 10, the system 30 is pushed back until the bosses 40a and 42a reach the back end of the slots 46a and 48a, respectively, as shown in FIG. 5 in connection with the side panel 42 and the rail 48. In this position, the tab 42b, and the corresponding tab on the side panel 40, engage the respective upper surfaces of the rails 46 and 48, to secure the system 30 in this position which is the closed position. Thus, the discs 26, or any other objects on the shelf 24 and the panel 32 are enclosed.

Figure 6:
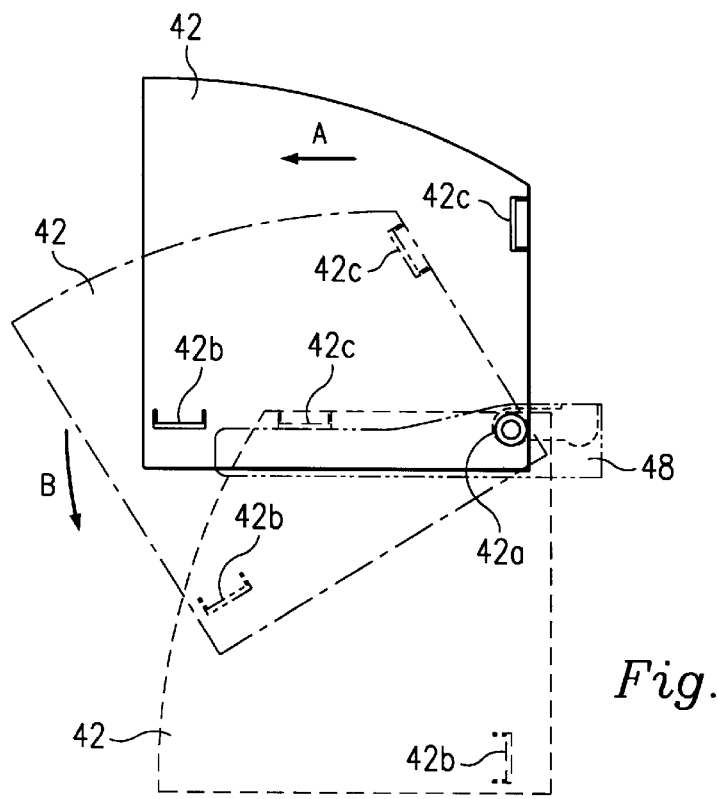

With reference to FIG. 6, in the event access to the discs 26, or other objects, is desired, the system 30 is initially pulled from its closed position shown by the solid lines in FIG. 6 forward in the direction indicated by the arrow A in FIG. 6 until the bosses 40a and 42a reach the front end of their respective slots 46a and 48a. In this position, the tab 42b clears the front end of the rail 48, and the corresponding tab on the side panel 40 clears the front end of the rail 46. The system 30 is then rotated in the direction indicated by the arrow B in FIG. 6 about the bosses 40a and 42a, respectively, to the intermediate position shown by the phantom lines and then to the final open position shown by the dashed lines. In the last position, the tab 42c and the corresponding tab formed on the side panel 40, engage the upper surfaces of the rails 46 and 48, respectively, to maintain the system 30 in this open position.

Figure 7:
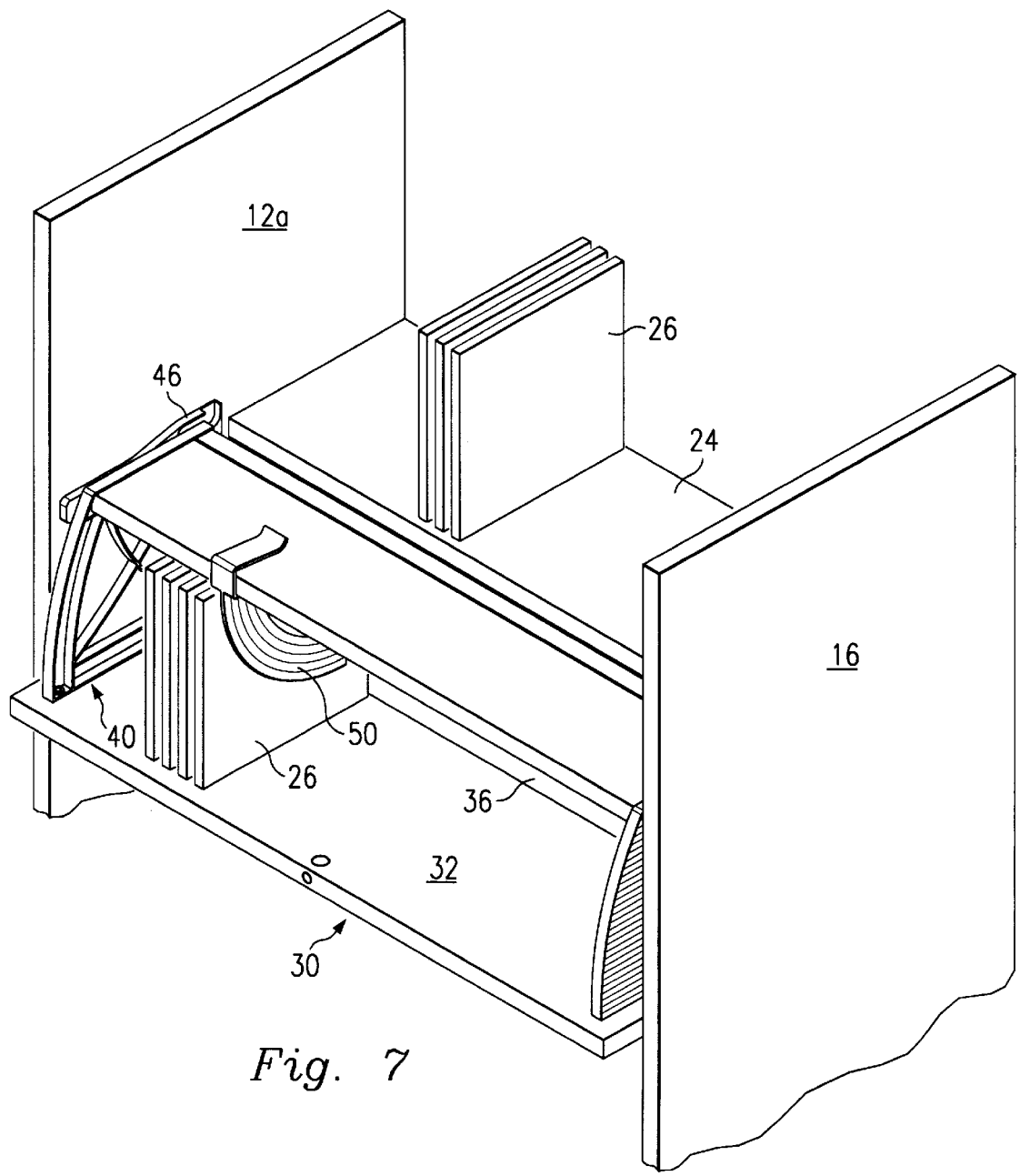
FIG. 7 is a view, similar to FIG. 3 but depicting the storage system in an open position.

As shown in FIG. 7, when the system is in its open position described above, the discs 26, or other objects stored on the shelf 24 and the panel 32 are easily accessible.

Thus, the above embodiment enjoys the advantages of storage objects that are normally not exposed and yet are easily accessible. Also, the objects can be stored on a back shelf or row yet are also easily accessible.

It is understood that several variations may be made in the foregoing without departing from the scope of the invention. For example, the cabinet 10 and the system 30 are not limited for use with computer and/or home entertainment equipment and the design of each, including their respective dimensions, as well as the number of shelves, etc. can be varied within the scope of the present invention. In this context, the system 30 can extend for the complete width of the cabinet and can be for the purpose of storing objects other than computer and/or entertainment media. Also, rather than rest on the desktop 22, the cabinet 10 can be designed to rest on the floor in which case it would be of a greater length and contain additional shelves and panels. Further, the spatial references, such as "upper", "lower", "side", "front", "rear", "horizontal", and "vertical" are for the purpose of illustration only and are not intended to limit the specific orientation or location of the structure described above.

Since other modifications, changes, and substitutions are intended in the foregoing disclosure, it is appropriate that the appended claims be construed broadly and in a manner consistent with the scope of the invention.

What is claimed is:

1. A storage system for use with a cabinet having a pair of spaced parallel walls and a shelf extending between the walls and towards the rear of the walls, with the depth of the shelf being less than the depth of the walls to create a space between the front of the walls and the shelf, the storage system comprising a rail member adapted to be mounted to at least one of the walls, a side panel connected to the rail member for pivotal and translational movement relative thereto, and at least one additional panel connected, and extending perpendicular, to the side panel for supporting objects to be stored, the side panel adapted to pivot and translate relative to the rail member between a first closed position in which the additional panel covers the area above the shelf, and a second position exposing the area above the shelf.

2. The system of claim 1 wherein there are at least two additional panels connected to the side panel for forming a storage area for the objects, and wherein, in the first closed position, one of the additional panels extends in the space and forms an extension of the shelf and the other additional panel forms a cover for the storage area.

3. The system of claim 2 wherein, in the second position, the one additional panel extends perpendicular to the shelf and the other additional panel supports an object to be stored.

4. The system of claim 2 further comprising a third additional panel connected to the side panel and extending perpendicular to the one additional panel and parallel to the other additional panel.

5. The system of claim 4 further comprising a member connected to the third additional panel and extending into the storage area defined by the panels for engaging and/or dividing stored objects.

6. The system of claim 1 wherein the side panel has a boss extending therefrom, and wherein the rail member has an opening for receiving the boss to permit the pivotal and translational movement.

7. The system of claim 6 wherein the opening is in the form of a slot which permits the pivotal movement as well as limited translation movement of the side panel, and therefore the at least one additional panel relative to the rail member.

8. The system of claim 7 wherein a portion of the slot extends to the upper surface of the rail member to permit the boss to be moved along the upper surface of the rail member and into the slot.

9. A cabinet for storing objects, the cabinet comprising a pair of spaced, parallel, vertically-extending, walls, a horizontally-extending shelf extending between the walls and towards the rear of the walls, with the depth of the shelf being less than the depth of the walls to create a space between the front of the walls and the shelf, a rail member mounted to at least one of the walls, a side panel connected to the rail member for pivotal movement relative thereto, and at least one additional panel connected, and extending perpendicular, to the side panel for supporting objects to be stored, the side panel adapted to pivot relative to the rail member between a first closed position in which the additional panel covers the area above the shelf, and a second position exposing the area above the shelf.

10. The cabinet of claim 9 wherein there are at least two additional panels connected to the side panel for forming a storage area for the objects, and wherein, in the first closed position, one of the additional panels extends in the space and forms an extension of the shelf and the other additional panel forms a cover for the storage area.

11. The cabinet of claim 10 wherein, in the second position, the one additional panel extends perpendicular to the shelf and the other additional panel supports an object to be stored.

12. The cabinet of claim 10 wherein there are two side panels respectively connected to the walls, and wherein the additional panels extend between, and are connected to, the side panels.

13. The cabinet of claim 10 further comprising a third additional panel connected to the side panel and extending perpendicular to a first one of the two additional panels and parallel to a second one of the two additional panels.

14. The cabinet of claim 13 further comprising a member connected to the third additional panel and extending into the storage area defined by the panels for engaging and/or dividing stored objects.

15. The cabinet of claim 9 wherein the side panel has a boss extending therefrom, and wherein the rail member has an opening for receiving the boss to permit the pivotal and translational movement.

16. The cabinet of claim 15 wherein the opening is in the form of a slot which permits the pivotal movement as well as limited translation movement of the side panel, and therefore the at least one additional panel relative to the rail member.

17. The cabinet of claim 16 wherein a portion of the slot extends to the upper surface of the rail member to permit the boss to be moved along the upper surface of the rail member and into the slot.

18. A storage cabinet comprising two spaced parallel walls, and a shelf extending between the walls and towards the rear of the walls, with the depth of the shelf being less than the depth of the walls to create a space between the front of the walls and the shelf; two rail members, each adapted to be mounted to a respective one of the walls; two side panels, each connected to a respective rail member for pivotal and translational movement relative thereto; at least one additional panel connected, and extending perpendicular, to the side panels for supporting objects to be stored; the side panels adapted to pivot and translate relative to the rail members between a first position in which the additional panel covers the area above the shelf, and a second position exposing the area above the shelf; and at least two additional panels extending between, and connected to, the side panels for forming a storage area for the objects; wherein, in the first closed position, one of the additional panels extends in the space and forms an extension of the shelf and the other additional panel forms a cover for the storage area.

19. A storage system comprising two spaced parallel walls, and a shelf extending between the walls and towards the rear of the walls, with the depth of the shelf being less than the depth of the walls to create a space between the front of the walls and the shelf; a rail member adapted to be mounted to at least one of the walls; a side panel connected to the rail member for pivotal and translational movement relative thereto; and at least two additional panels connected to the side panel for forming a storage area, the side panel adapted to pivot and translate relative to the rail member between a first position in which the storage area is closed and a second position in which the storage area is open and one of the additional panels is in the space and forms an extension of the shelf.

20. The system of claim 19 wherein, in the second position, the shelf is exposed for storing additional objects.

21. The system of claim 19 wherein, in the second position, one of the two additional panels extends perpendicular to the shelf and the other one of the additional panels supports an object to be stored.

22. The system of claim 19 wherein there are two side panels respectively mounted to the walls, and wherein the additional panels extend between, and are connected to, the side panels.

23. The system of claim 19 further comprising a third additional panel connected to the side panel and extending perpendicular to a first one of the two additional panels and parallel to the a second one of the additional panels.

24. The system of claim 23 further comprising a member connected to the third additional panel and extending into the storage area defined by the panels for engaging and/or dividing stored objects.

25. The system of claim 19 wherein the side panel has a boss extending therefrom, and wherein the rail member has an opening for receiving the boss to permit the pivotal and translational movement.

26. The system of claim 25 wherein the opening is in the form of a slot which permits the pivotal movement as well as limited translation movement of the side panel, and therefore the additional panels relative to the rail member.

27. The system of claim 26, wherein a portion of the slot extends to the upper surface of the rail member to permit the boss to be moved along the upper surface of the rail member and into the slot.

28. A storage cabinet comprising two spaced parallel walls, a shelf extending between the walls and towards the rear of the walls, with the depth of the shelf being less than the depth of the walls to create a space between the front of the walls and the shelf; a rail member adapted to be mounted to at least one of the walls; a side panel connected to the rail member for pivotal and translational movement relative thereto, and at least two additional panels connected to the side panel for forming a storage area, the side panel adapted to pivot and translate relative to the rail member between a first position in which the storage area is closed and a second position in which the storage area is open and one of the panels is located in the space and forms an extension of the shelf.

29. The cabinet of claim 28 wherein, in the second position, the shelf is exposed for storing additional objects.

30. The cabinet of claim 28 wherein, in the second position, one of the two additional panels extends perpendicular to the shelf and the other one of the two additional panels supports an object to be stored.

31. The cabinet of claim 28 wherein there are two side panels respectively connected to the walls, and wherein the additional panels extend between, and are connected to, the side panels.

32. The cabinet of claim 28 further comprising a third additional panel connected to the side panel and extending perpendicular to a first one of the two additional panels and parallel to a second one of the two additional panels.

33. The cabinet of claim 32 further comprising a member connected to the third additional panel and extending into the storage area defined by the panels for engaging and/or dividing stored objects.

34. The cabinet of claim 28 wherein the side panel has a boss extending therefrom, and wherein the rail member has an opening for receiving the boss to permit the pivotal and translational movement.

35. The cabinet of claim 34 wherein the opening is in the form of a slot which permits the pivotal movement as well as limited translation movement of the side panel, and therefore the additional panels relative to the rail member.

36. A storage cabinet for use with a cabinet having a pair of spaced parallel walls, the storage cabinet comprising a rail member adapted to be mounted to at least one of the walls, a side panel connected to the rail member for pivotal and translational movement relative thereto, and at least two additional panels connected to the side panel for forming a storage area, the side panel adapted to pivot and translate relative to the rail member between a first position in which the storage area is closed and a second position in which the storage area is open; wherein the side panel has a boss extending therefrom, wherein the rail member has an opening for receiving the boss to permit the pivotal and translational movement; wherein the opening is in the form of a slot which permits the pivotal movement as well as limited translation movement of the side panel, and therefore the additional panels relative to the rail member; and wherein a portion of the slot extends to the upper surface of the rail member to permit the boss to be moved along the upper surface of the rail member and into the slot.

37. A method of storing objects in a cabinet, the method comprising the steps of mounting a rail member to at least one of the walls of the cabinet, pivotally and translationally connecting a side panel to the rail member for pivotal and transnational movement relative thereto, connecting at least two additional panels to the side panel to form a storage area, supporting the objects on one of the additional panels, pivoting and translating the side panel relative to the rail member between a first position in which the storage area is closed and a second position in which the storage area is open, and wherein, in the first closed position, one of the additional panels extends in a space in front of a shelf in the cabinet and forms an extension of the shelf and the other additional panel forms a cover for the storage area.

38. The method of claim 37 wherein, in the second position, the one additional panel extends perpendicular to the shelf and the other additional panel supports the objects to be stored.

39. The method of claim 37 further comprising the step of mounting a third additional panel to the side panel and extending perpendicular to a first one of the two additional panels and parallel to a second one of the two additional panels.

40. The method of claim 39 further comprising the step of mounting a member to the third additional panel and extending the member into the storage area defined by the panels for engaging and/or dividing stored objects.

41. The method of claim 37 wherein the step of mounting comprises the step of mounting another rail member to at least another one of the walls of the cabinet, pivotally and translatably connecting another side panel to the other rail member for pivotal and translational movement relative thereto, and connecting at least one of the additional panels to the other side panel.

42. The method of claim 37 further comprising the step of translating the side panel, and therefore the other panels relative to the walls to permit the pivotal movement.

43. The method of claim 42 further comprising the steps of forming a boss on the side panel and an opening on the rail member for receiving the boss to permit the pivotal movement, wherein a portion of the slot extends to the upper surface of the rail member to permit the boss to be translated along the upper surface of the rail member and into the slot during installation of the side panel, and therefore the additional panels.

* * * * *